United States Patent [19]
Potchen

[11] Patent Number: 6,093,912
[45] Date of Patent: Jul. 25, 2000

[54] THERMOPLASTIC MELTING APPARATUS

[76] Inventor: Robert T. Potchen, 1335 MacTavandash Dr., Oviedo, Fla. 32765

[21] Appl. No.: 09/368,954

[22] Filed: Aug. 5, 1999

[51] Int. Cl.[7] .............................. F27B 14/14; B67D 5/63
[52] U.S. Cl. ......................... 219/422; 29/426; 222/146.5
[58] Field of Search ................................... 219/417, 421, 219/422, 426; 126/343.5 A; 222/146.5

[56] References Cited

U.S. PATENT DOCUMENTS

| | | | |
|---|---|---|---|
| 4,666,066 | 5/1987 | Boccagno et al. | 222/146.5 |
| 5,374,120 | 12/1994 | Possanza et al. | 126/343.5 A |
| 5,657,904 | 8/1997 | Frates et al. | 222/146.5 |

FOREIGN PATENT DOCUMENTS 9-206585  8/1987  Japan .

*Primary Examiner*—Joseph Pelham
*Attorney, Agent, or Firm*—William M. Hobby, III

[57] ABSTRACT

A thermoplastic melting apparatus for melting and dispensing hot melted adhesive materials includes a melting tank having an output line coupled to the bottom thereof for discharging a melted hot melt adhesive from the melting tank. A plurality of finned heat exchanger units are each mounted to the melting tank in the bottom portion of the tank but spaced from the bottom of the tank to allow for a 360° contact with the melted thermoplastic material being heated by the heat exchanger unit. Each of the finned heat exchanger units have an elongated center bore therein and a resistance heating element mounted in each elongated bore. Each of the plurality of finned heat exchanger units is mounted within the melting tank chamber by a press fit aligning the opening in the elongated center bore with an opening in a wall of the tank. A threaded bolt is threaded from outside the tank into the opening to the center bore of the center core of each heat exchanger unit. The mounting bolt has a passageway therethrough for connecting to the heating element within the finned heat exchanger unit. The plurality of finned heat exchanger units are each mounted parallel to each other. Each fin has a pair of angled sides, each angled side being connected to an angled side of an adjacent fin with a curved surface between the bases of the fins. Each fin also has a curved apex and is generally circular in shape.

7 Claims, 3 Drawing Sheets

THERMOPLASTIC MELTING APPARATUS

BACKGROUND OF THE INVENTION

This invention relates generally to thermoplastic melting machines and more specifically to devices for melting and dispensing hot melt adhesive materials.

Thermoplastic adhesive materials are heated and liquified just prior to their application on a substrate and are referred to as "hot melt adhesives". Hot melt adhesives are available in bulk in such forms as chicklets, pellets, slats, bricks and slugs contained in a drum or the like. A drum of bulk adhesive material may be as large as a conventional 55 gallon drum for large scale applications.

The present invention is directed at solving some of the problems encountered with melting adhesive which is initially contained in a slug. Typically, hopper type dispensers have been used to melt a block of adhesives as it contacts a heated melting grid at the bottom of the hopper. A heated reservoir is disposed beneath the melting grid and receives the melted or liquified hot melted adhesive as it passes through the grid. The reservoir maintains the adhesive in a melted liquid state until the application of the adhesive. An outlet of the reservoir typically leads to a pump for pumping the hot melt adhesive to a dispensing apparatus appropriate for the application.

One of the characteristics of many hot melt materials is that they oxidize, char, or degrade when exposed to heat substantially above their melting temperature when exposed to heat in the molten state for a protracted length of time. In the case of many hot melt adhesives, this degradation results in the material loosing its adhesive property and becoming charred. Because of the thermal degradation characteristic, temperature control of the thermoplastic material must be maintained both during melting and for so long as the material is in a molted state. The material must not be exposed to excessive temperatures during melting or until distribution onto a target substrate. One of the factors in determining the time required to melt a given quantity of thermoplastic material is the efficiency of the equipment within which the material is being melted. The evenness of the heat imparted by that equipment to the solid thermoplastic material determines not only the efficiency but the amount of degradation experienced by that solid thermoplastic material during its conversion from the solid to the thermoplastic state. In other words, if the melting apparatus has hot spots, it will subject selected portions of the solid thermoplastic material to excessive temperatures and consequent thermodegradation. On the other hand, if the material has cold spots, it will be relatively inefficient and will take protracted lengths of time to convert a given quantity of solid thermoplastic material from the solid to the molten state.

It is an object of the present invention to provide an improved apparatus for melting thermoplastic materials and for maintaining them in a molten state which provides even heating in a more efficient heating apparatus.

Typical prior art devices for melting solid thermoplastic materials include tank-type melters or grid-type melters. The grid-type melter operates upon the principal of supporting the solid thermoplastic material upon the top of a heated open grid which grid is maintained at a temperature substantially above the melting temperature of the thermoplastic material. The solid material is melted upon contact with this grid and falls through the grid into a reservoir located beneath the grid. From this reservoir, the molten material is pumped to the dispenser. Grid-type melters are generally more efficient than tank-type melters but are generally more expensive because they operate at higher temperatures and subject the molten material to high temperatures and thus requires greater temperature control. Tank-type melters utilize heated walls of a tank to impart sufficient heat to solid thermoplastic material contained within the tank to melt it and convert it to a liquid state. Tank-type melters may utilize a single heating element cast into the bottom wall of the tank to generate the heat required to melt the thermoplastic material. Tank-type melters are thus generally less expensive than grid melters.

It is an object of this invention to provide an improved melter tank for melting and dispensing thermoplastic materials, such as hot melt adhesives, which is more efficient and provides a more even heating than prior tank melters. The improved efficiency derives from the nature and positioning of the heat exchanger units mounted in the tank in which the heat exchanger units are placed above the bottom of the tank and have a predetermined fin design which allows the adhesive to be heated on all sides of the heat exchanger unit and which also allows for better control of the heating elements. The placement of a plurality of heat exchanger units also works to maintain a portion of the solid thermoplastic materials in a molten state covered by the solid thermoplastic materials and to maintain the thermoplastic adhesive material within a close temperature range.

SUMMARY OF THE INVENTION

A thermoplastic melting apparatus for melting and dispensing hot melted adhesive materials includes a melting tank having an output line coupled to the bottom thereof for discharging a melted hot melt adhesive from the melting tank. A plurality of finned heat exchanger units are each mounted to the melting tank in the bottom portion of the tank but spaced from the bottom of the tank to allow for a 360° contact with the melted thermoplastic material being heated by the heat exchanger unit. Each of the finned heat exchanger units have an elongated center bore therein and a resistance heating element mounted in each elongated bore. Each of the plurality of finned heat exchanger units is mounted within the melting tank chamber by a press fit aligning the opening in the elongated center bore with an opening in a wall of the tank. A threaded bolt is threaded from outside the tank into the opening to the center bore of the center core of each heat exchanger unit. The mounting bolt has a passageway therethrough for connecting to the heating element within the finned heat exchanger unit. The plurality of finned heat exchanger units are each mounted parallel to each other. Each fin has a pair of angled sides, each angled side being connected to an angled side of an adjacent fin with a curved surface between the bases of the fins. Each fin also has a curved apex and is generally circular in shape.

BRIEF DESCRIPTION OF THE DRAWINGS

Other objects, features, and advantages of the present invention will be apparent from the written description and the drawings in which.

DETAILED DESCRIPTION OF THE PREFERRED EMBODIMENT

Figure 1:
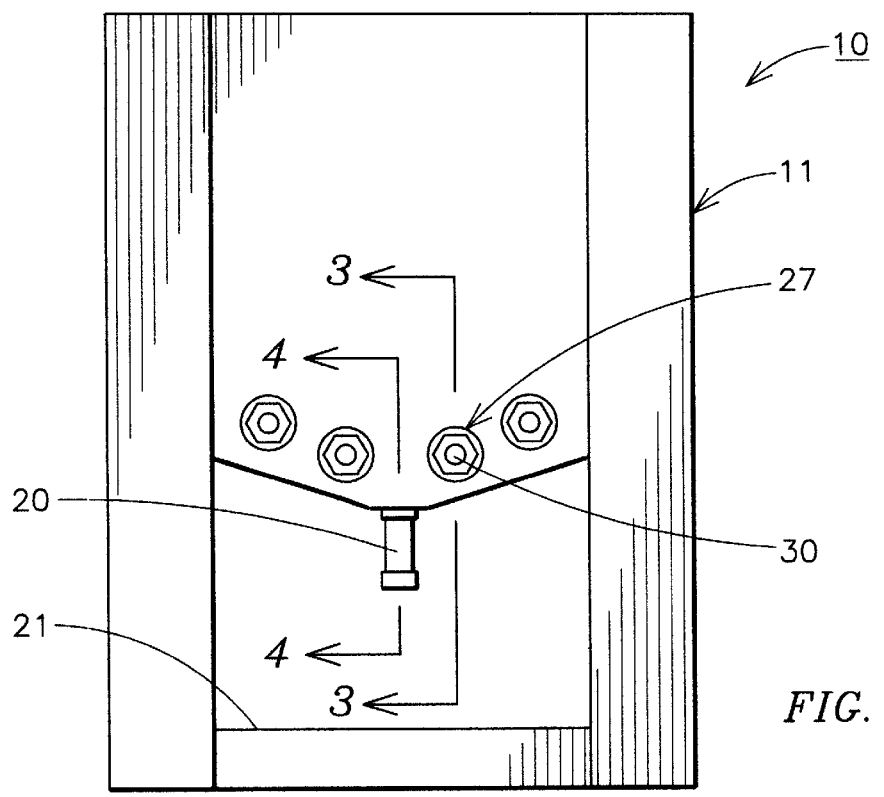
FIG. 1 is a side elevation of a thermoplastic melting machine in accordance with the present invention.
Figure 2:
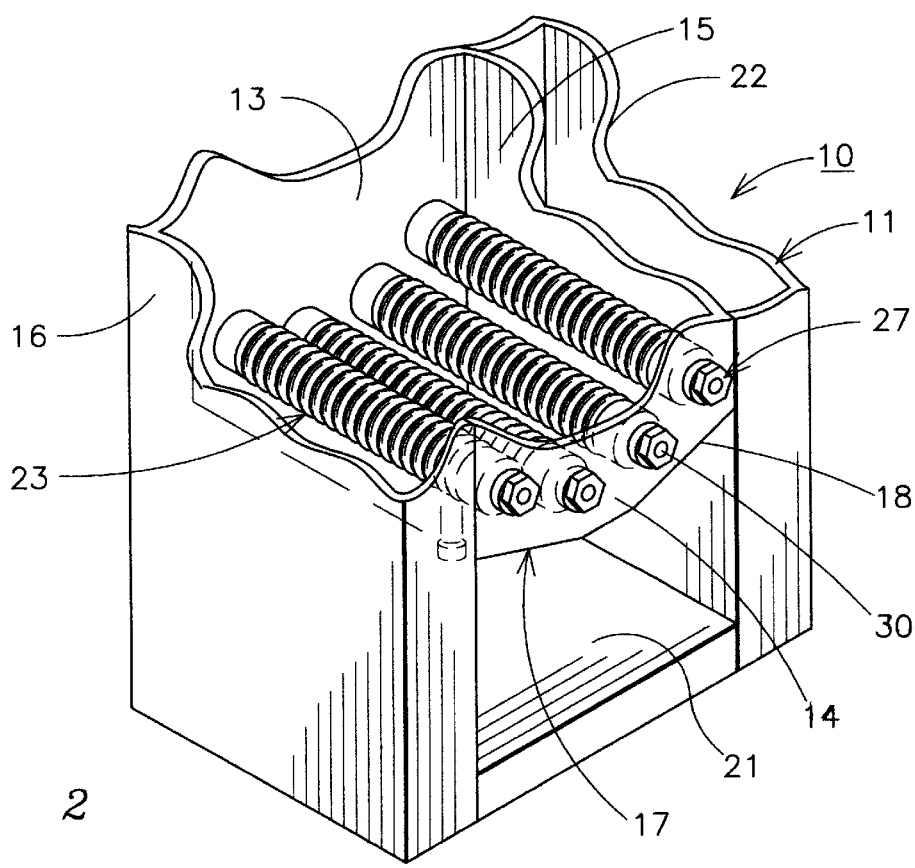
FIG. 2 is a cutaway perspective of the melting machine of FIG. 1.
Figure 3:
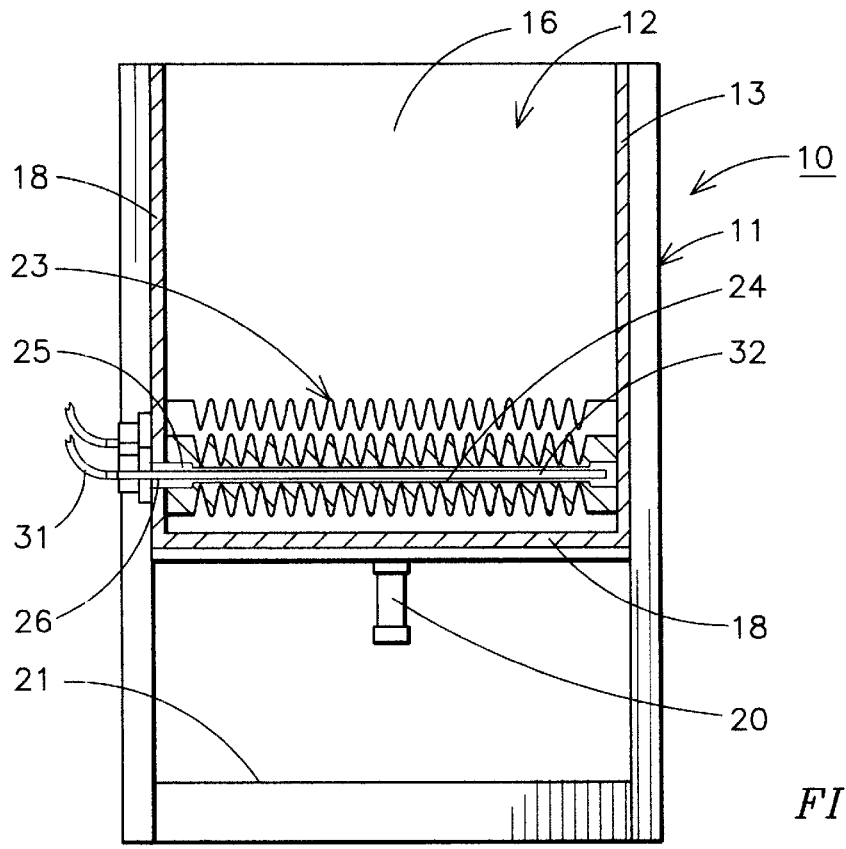
FIG. 3 is a sectional view taken on the line 3—3 of FIG. 1.
Figure 4:
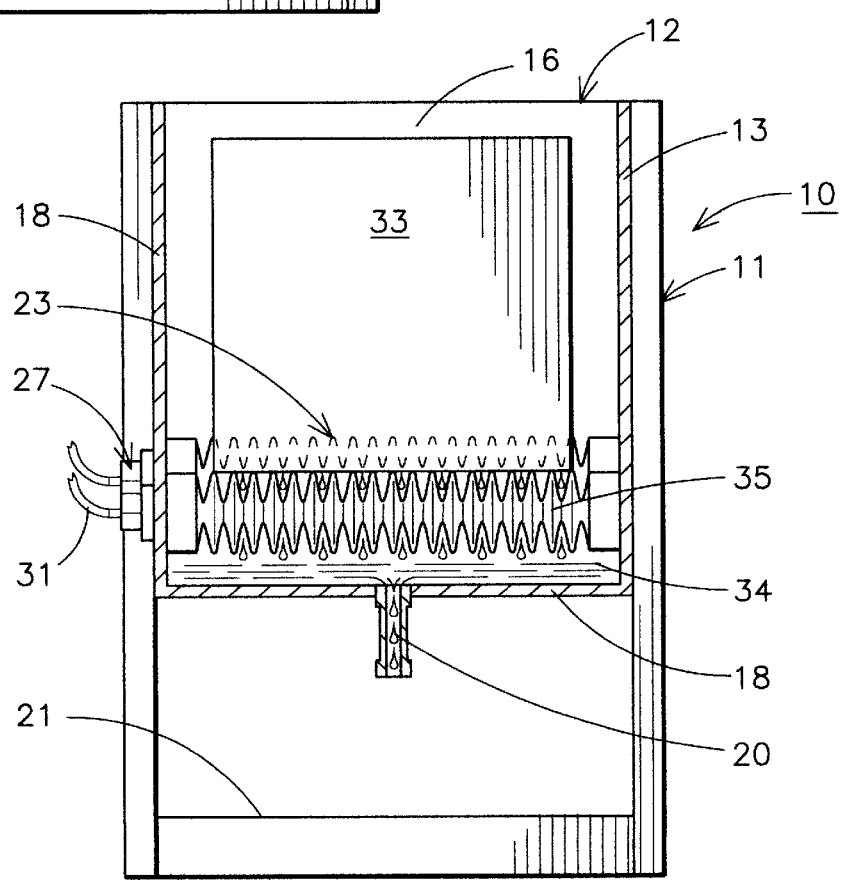
FIG. 4 is a sectional view taken on the line 4—4 of FIG. 1.

Referring to the drawings FIGS. 1–4, a thermoplastic melting machine 10 is illustrated for melting hot melt adhesives and the like and includes a housing 11 having a thermoplastic melt material melting tank 12 thereinside forming a melting chamber having side walls 13, 14, 15, and 16 and an angled bottom 17 to form the melting tank. At the bottom of the angled bottoms 17 and 18, a dispenser pipe 20 exits the melting tank 12. The thermoplastic melting machine housing 11 has a base 21 along with double walled sides 22. A plurality of finned heat exchanger units 23 are mounted within the tank 12. Each finned heat exchanger unit 23 is press fitted between the wall 13 and the wall 17 and each has a bore 24 extending therethrough with an enlarged threaded countersunk portion 25 in each end thereof. The countersunk portion is aligned at one end with an opening 26 within the melting tank wall 16. A single bolt 27 having external threads 28 is then threaded through the opening 26 and into the countersunk threaded portion 25 of the heat exchanger unit 23 to further hold the heat exchanger 23 in a desired position within the tank 12. The bolt 27 has a passageway 30 extending therethrough which thereby allows the electrical conductor 31 to pass therethrough for the heating element 32 mounted within the bore 24 of each heat exchanger unit 23. A block of hot melt adhesive 33 may be positioned in the tank 12 and can ride directly on the plurality of heating exchanger units 23. Four heating exchanger units are used in the melting machine of FIGS. 1–4 and are placed at different levels, as seen in FIG. 2. As the hot melt slug 33 melts, it forms a liquid pool of adhesive 34 which surround the circular heating fins of the heating element 23 and thereby maintains an even heat by heating in a 360° range around each heat exchanger 23.

Figure 5:
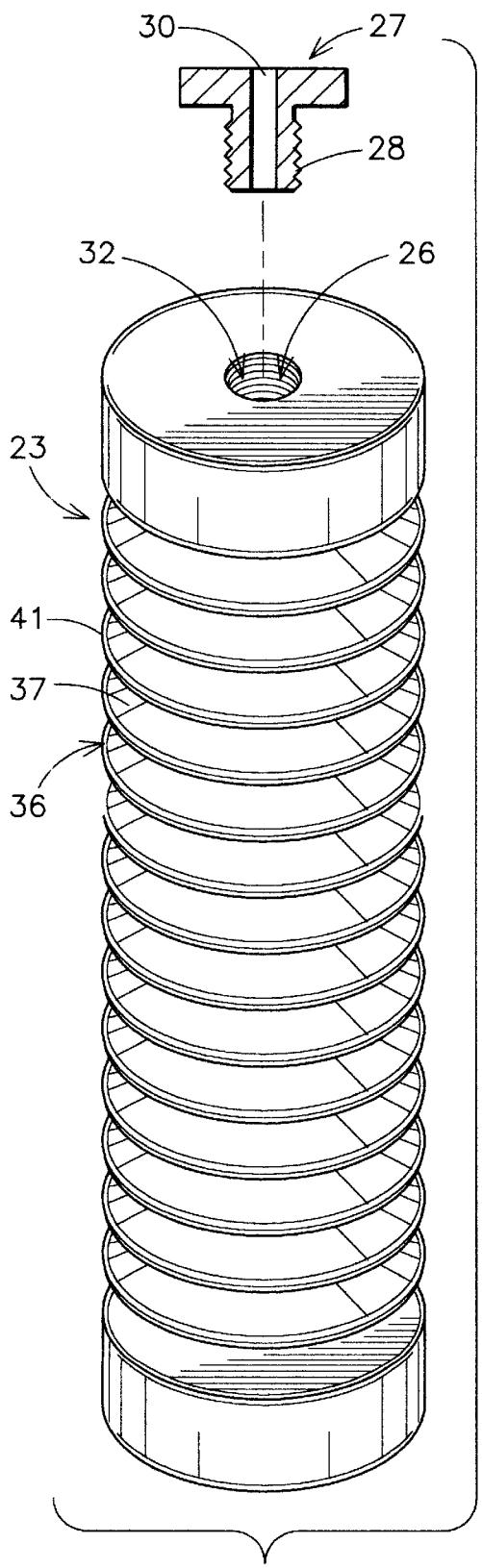
FIG. 5 is an exploded perspective view of a heat exchanger unit and an attaching bolt used in the thermoplastic melting machine of FIGS. 1–4.
Figure 6:
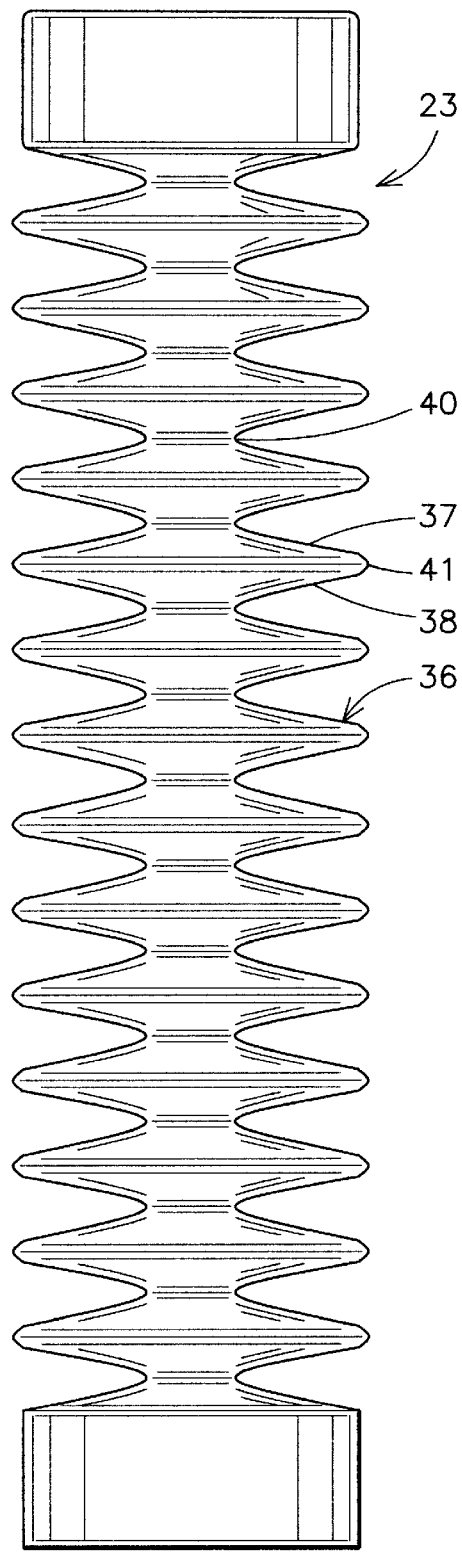
FIG. 6 is a side elevation of the heat exchanger unit of FIG. 5.

As more clearly seen in FIGS. 5 and 6, the heat exchanger 23 has the bore 32 extending therein and the threaded countersunk portion 26 at one end is attached in alignment with the bolt 27 having the passageway 30 therethrough and external threads 28. Each heat exchanger has a plurality of annular fins 36, each having angled sides 37 and 38 on each side thereof and each adjacent fin having one of their angles sides connected to the angled side of the adjacent film with a curved trough 40. Each fin also has a curved apex 41 and can be made of a cast material, such as a cast aluminum. The heat exchanger unit both transfers the heat and acts as a heat sink because of the thickness of the cast aluminum. The heat exchanger unit 23 provides a large surface area over the length of the heat exchanger unit to help maintain a constant temperature in the hot melt adhesive. Thus, the heat exchanger unit 23 provides an efficient transfer of the heat and a plurality of units are spaced above the bottom of the tank 12 to allow the adhesive to be heated in a 360° area around each heat exchanger unit 23. Each heating exchanger unit 23 acts as a heat sink with a large surface area and is shaped with the curved surfaces to avoid hot spots and cold spots typically found in a finned heat exchanger which can cause degradation of the adhesive. This allows the adhesive to be maintained at a predetermined temperature within a very close range to prevent the degradation of the adhesive and by using a plurality of heat exchangers operating in a 360° heating of the adhesive with a large surface area improves the efficiency of the melting of the adhesives and the maintaining of the adhesives within a close temperature tolerance.

It should be clear at this time that a thermoplastic material melting apparatus has been provided for liquifying hot melt adhesives with an improved efficient temperature control. However, it should also be clear that the present invention should not be limited to the forms shown which are to be considered illustrative rather than restrictive.

What is claimed is:

1. A thermoplastic melting machine comprising:

a thermoplastic material melting tank having a plurality of sides and a bottom portion having an angled bottom;

an output line coupled to the bottom portion of said melting tank for discharging melted thermoplastic material from said melting tank;

a plurality of heat exchanger units, each said heat exchanger unit having a plurality of fins surrounding a central core having an elongated bore therein, each said fin having a pair of angled sides, each angled side intersecting the other angled side of a fin with a curved surface and each said fin having one of said pair of angled sides intersecting another angled side of an adjacent fin with a curved base surface and, each said heat exchanger unit being mounted above the angled bottom of said melting tank for 360 degree contact with thermoplastic material in said melting tank and each heat exchanger unit being mounted generally parallel to each other heat exchanger unit between two said sides of said melting tank; and a plurality of resistance heating elements, each heating element being mounted in one heat exchanger unit central core elongated bore and coupled through one of said melting tank sides to an electrical source, whereby a thermoplastic material is melted in a melting tank having a plurality of finned heat exchanger units heating the thermoplastic material on a 360 degree finned surface.

2. A thermoplastic melting machine in accordance with claim 1 in which each said heat exchanger unit is press fitted in said melting tank between two sides, one said side having an aperture therethrough aligned with one heat exchanger unit central core elongated bore opening and having said electrical source coupled therethrough.

3. A thermoplastic melting machine in accordance with claim 2 including a mounting nut having a bore therethrough attached through each said side opening to said heat exchanger unit and having said electrical source coupled therethrough to said heating element inside said heat exchanger unit central core bore.

4. A thermoplastic melting machine in accordance with claim 3 in which each said mounting nut has a seal between said mounting nut and the side of said melting tank.

5. A thermoplastic melting machine in accordance with claim 4 in which each said heat exchanger units is mounted parallel to each other on at least two levels relative to the bottom of said melting tank.

6. A thermoplastic melting machine in accordance with claim 5 in which each heat exchanger unit central core has a threaded countersunk portion into one end of said central core bore for threadedly attaching said mounting nut thereto.

7. A thermoplastic melting machine in accordance with claim 6 in which each heat exchanger unit fin has a generally circular shape around said central core.

* * * * *